6277X
J.C. Gentry,
Horse Power.
Patented Dec. 14, 1830.
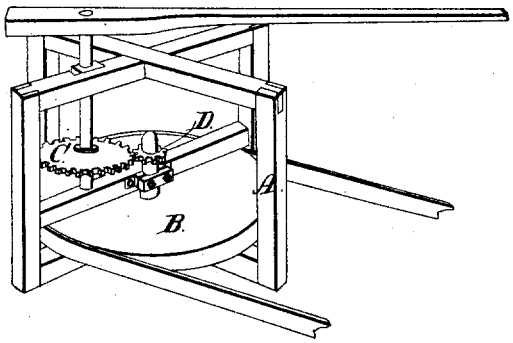
Witnesses.
Wm. D. Elliot
Wm. Burton
Inventor.
Jos. C. Gentry
A.M. PHOTO-LITHO. CO. N.Y. (OSBORNE'S PROCESS)

{ * Disclaimer entered, 4 November 1837 } Dec 14 1830 6271X 329.

* Joseph C. Gentry Philadelphia Pennsylvania
Letters Patent. Dated Dec. 14. 1830.

The Schedule referred to in these Letters Patent and making part of the same containing a de-
scription in the words of the said Joseph C. Gentry himself of his improvement being a port-
able machine for conveying animal power to any kind of machinery

Be it known. that I Joseph C. Gentry of Philadelphia. County of Philadelphia
and State of Pennsylvania have made an improvement being a portable machine for con-
veying animal power to any kind of machinery which is described as follows.
This machine consists of the following principal parts. 1st The Frame; 2 The Strap
Wheel. 3. The Cog Wheel... 1st The Frame is constructed in the following manner:
make two sills of timber about 4 inches square placed at right angles and crossing
in the centre. Into these sills are tenoned four posts about 6 inches from the end of each
sill to leave room for the screws for fastening them. They may be about 2 feet 4 inches
high and 4 inches square. On the top are two other pieces of timber about 7 feet long
and similar to the sills, crossing each other at right angles in the centre and tenoned
into the posts. Another piece of timber or rail of the same dimensions as the last men-
tioned is placed about 5 inches from the sill and tenoned into two of the posts.
2. The Strap Wheel is made of wood or any suitable material about 8 feet diameter and
3 inches thick. On the periphery is a groove or any other suitable convenience to receive
a Rope or Strap by which the motion is to be conveyed to the machinery.
The wheel has a shaft fixed in the centre and turns in the centre of the frame on a metal
step. On this shaft is a pinion about 6 inches diameter made of cast iron.
3d. The Cog Wheel is made of cast iron or any other suitable materials about 4 feet di-
ameter with a convenient number of cogs. This cog wheel turns on a shaft supported
on the before mentioned rail and turning in a box in the upper part of the frame. The
shaft is sufficiently high above the frame to admit of a sweep.
Operation. The strap being passed round the strap wheel and continued a sufficient distance
for the animal to pass over is cased over. The animal is attached to the sweep connected
with the shaft and is made to walk round the frame. This turns the cog wheel which operates
on the pinion and causes the strap wheel to revolve. The motion is communicated to any kind
of machinery by the rope or strap before mentioned. The Invention here claimed and which
I desire to be secured by Letters Patent is the above described machine for conveying Drawing

6277X power to any kind of machinery. Farther to illustrate my invention I refer to the model and drawing of the same deposited in the Patent Office In testimony whereof I have hereunto signed my name before two witnesses and made oath to the same this 26th day of November 1830

Witnesses
W. P. Elliot
Jno Chalmers

Joseph C. Gentry

Exd.
WPE

532

(Patented December 14. 1830)

Rec'd & Recorded anew Aug 7th '837

Disclaimer

I Joseph C. Gentry, Patentee of a Patent granted on the 14th day of December, 1830, for an improvement being "a Portable Machine for conveying animal power to any kind of machinery" desire it to be distinctly understood that I make no claim to the combination and arrangement of the frame, Cog wheels, band or strap wheel, shafts and Sweep, as therein described. —

All that I intend to claim and which I wish to secure by Letters Patent is the method of conveying power from the driving machine to any kind of machinery to be propelled, by means of a strap or band passing under the animal's feet from the band wheel of the driving machine to the machine to be propelled in the manner before described or in any other mode substantially the same in principle, where a belt, strap, cord, or chain is used. — And I hereby disclaim all other rights or claims secured or supposed to be secured by said Letters Patent except that which is now specially mentioned as claimed —

Washington, October 28, 1837

Joseph C. Gentry

Witnesses
Wm P. Elliot
[illegible] Wm Bishop (Gentry)